United States Patent
Anderson (10) Patent No.: US 7,379,048 B2
(45) Date of Patent: May 27, 2008

(54) HUMAN-COMPUTER INTERFACE INCLUDING EFFICIENT THREE-DIMENSIONAL CONTROLS

(75) Inventor: Thomas G. Anderson, Albuquerque, NM (US)

(73) Assignee: Novint Technologies, Inc., Albuquerque, NM (US)

( * ) Notice: Subject to any disclaimer, the term of this patent is extended or adjusted under 35 U.S.C. 154(b) by 331 days.

(21) Appl. No.: 10/831,682

(22) Filed: Apr. 22, 2004

(65) Prior Publication Data
US 2004/0207664 A1    Oct. 21, 2004

Related U.S. Application Data

(63) Continuation of application No. 09/960,343, filed on Oct. 17, 2000, now Pat. No. 6,727,924.

(51) Int. Cl.
*G09G 5/08* (2006.01)
(52) U.S. Cl. .................. 345/157; 715/701; 715/702; 715/836; 715/850; 715/856
(58) Field of Classification Search ............ 345/157, 345/158, 161, 163, 167, 168, 173; 715/836, 715/848, 850, 856, 701, 702, 782, 851, 852
See application file for complete search history.

(56) References Cited

U.S. PATENT DOCUMENTS

| | | | | |
|---|---|---|---|---|
| 5,734,805 A | * | 3/1998 | Isensee et al. ............... 345/419 |
| 5,926,179 A | * | 7/1999 | Matsuda et al. ............. 715/752 |
| 6,054,989 A | * | 4/2000 | Robertson et al. .......... 715/848 |
| 6,097,393 A | * | 8/2000 | Prouty et al. ................ 345/419 |
| 6,727,924 B1 | * | 4/2004 | Anderson .................... 715/851 |
| 6,734,847 B1 | * | 5/2004 | Baldeweg et al. .......... 345/419 |
| 7,023,423 B2 | * | 4/2006 | Rosenberg .................. 345/161 |

* cited by examiner

*Primary Examiner*—Henry N Tran
(74) *Attorney, Agent, or Firm*—V. Gerald Grafe (57) ABSTRACT

The present invention provides a method of human-computer interfacing that provides efficient implementation of intuitive controls in a three-dimensional space. The method comprises providing a three-dimensional space, characterized by x and y dimensions, together defining a plane approximately orthogonal to the user's direction of view into the space. A z dimension, approximately parallel to the direction of view, further characterizes the three-dimensional space. Objects in the space can be defined by x, y, and z coordinate sets. A control is provided having x and y coordinate sets as any other object. The z coordinate set of the control, however, spans a range of values, giving the control an increased depth. The control's range of z can be infinite, making the control accessible at all depths, or can be a finite range, making the control accessible only from that range of depths. Movement of a cursor into the region corresponding to the control initiates interaction with the user according to the control. The increased depth makes it easier for the user to access the control, since it reduces the precision of depth perception required to find the control. Once the user is in the region corresponding to the control, the effective depth for interaction can be relative to the depth when the user entered the control region, providing control interaction independent of entering depth.

18 Claims, 5 Drawing Sheets

Figure 5b ional interfaces in real-world situations, visual and tactile depth perception aid in finding and manipulating such controls. For example, the controls of a car radio are always in some understandable relationship to the usual position of the driver. Such simplistic relationship can be undesirable in a three-dimensional computer environment, however, where the user can desire that controls be available during three-dimensional navigation free of the requirement of experiencing the environment through a windshield.

HUMAN-COMPUTER INTERFACE INCLUDING EFFICIENT THREE-DIMENSIONAL CONTROLS

PRIORITY CLAIM

This application is a continuation of and claims the benefit of U.S. patent application Ser. No. 09/690,343, filed on Oct. 17, 2000, now U.S. Pat. No. 6,727,924, issued Apr. 27, 2004, incorporated herein by reference.

BACKGROUND OF THE INVENTION

This invention relates to the field of human-computer interfaces, specifically those relating to multidimensional displays and navigation, interaction with multidimensional environments and objects, and methods of intuitively interfacing therewith.

Computing technology has seen a many-fold increase in capability in recent years. Processors work at ever higher rates; memories are ever larger and always faster; mass storage is larger and cheaper every year. Computers now are essential elements in many aspects of life, and are often used to present three dimensional worlds to users, in everything from games to scientific visualization.

The interface between the user and the computer has not seen the same rate of change. Screen windows, keyboard, monitor, and mouse are the standard, and have seen little change since their introduction. Many computers are purchased with great study as to processor speed, memory size, and disk space. Often, little thought is given to the human-computer interface, although most of the user's experience with the computer will be dominated by the interface (rarely does a user spend significant time waiting for a computer to calculate, while every interaction must use the human-computer interface).

As computers continue to increase in capability, new interface methods are needed to fully utilize new modes of human-computer communication. Preferably, such new methods can build on interface methods learned by users in real-world situations and in two-dimensional computer interfaces. Specifically, users have become accustomed to two-dimensional computer interfaces, with control panels, menus, and buttons. Users are also accustomed to three-dimensional interfaces in real-world situations, visual and tactile depth perception aid in finding and manipulating such controls. For example, the controls of a car radio are always in some understandable relationship to the usual position of the driver. Such simplistic relationship can be undesirable in a three-dimensional computer environment, however, where the user can desire that controls be available during three-dimensional navigation free of the requirement of experiencing the environment through a windshield.

Interfaces using three dimensions allow for a more natural human interface experience compared with contemporary two-dimensional computer interfaces. A few three-dimensional display interface standards exist, for example Openinventor, OpenGL, and direct3D. See "OpenGL® Programming Guide, Third Edition", *OpenGL Architecture Review Board*. At least one haptic interface standard exists, Ghost. See the webpage at sensable.com/products/ghost.htm. These standards, while suitable for three-dimensional display and interaction, do not allow the user to apply experience gained in real-world controls, and in two-dimensional interfaces. Attempts to provide intuitive, familiar controls in a three-dimensional interface generally either require explicit transitions out of the three-dimensional interface (sacrificing the intuitiveness of the interface) or encounter significant problems related to depth perception in three-dimensional spaces (the user has difficulty finding the controls in the depth of the three-dimensional space).

Fuller realization of the entertainment and productivity benefits possible from computer technology requires improved interfaces. Accordingly, there is a need for improved methods of human-computer interfacing that offer more intuitive navigation and control of the computer, providing the user an intuitive interface incorporating familiar control concepts with three-dimensional spaces.

SUMMARY OF THE INVENTION

The present invention provides a method of human-computer interfacing that provides efficient implementation of intuitive controls in a three-dimensional space. The method comprises providing a three-dimensional space, characterized by x and y dimensions, together defining a plane approximately orthogonal to the user's direction of view into the space. A z dimension, approximately parallel to the direction of view, further characterizes the three-dimensional space. Objects in the space can be defined by x, y, and z coordinate sets. A control is provided having x and y coordinate sets as any other object. The z coordinate set of the control, however, spans a range of values, giving the control an increased depth. The control's range of z can be infinite, making the control accessible at all depths, or can be a finite range, making the control accessible only from that range of depths. Movement of a cursor into the region corresponding to the control initiates interaction with the user according to the control. The increased depth makes it easier for the user to access the control, since it reduces the precision of depth perception required to find the control. Once the user is in the region corresponding to the control, the effective depth for interaction can be relative to the depth when the user entered the control region, providing control interaction independent of entering depth.

The present invention also can comprise haptic feedback to further enhance the human-computer interface. Haptic feedback can provide force feedback allowing the user's sense of touch to enhance control of the interface. The ability to readily find controls, without fine precision depth perception, combined with consistent haptic feedback, can provide an efficient and intuitive human-computer interface. The present invention can also comprise a plurality of controls, each corresponding to its range of z coordinates. The interface can provide a set of controls, easy to find and intuitive to use, to the user. Different ranges of z coordinates can allow the set of controls available to the user to be specific to the region of the space. For example, the interface can provide one set of controls when the user is outside a specific region, and another when the user navigates inside the region.

The interface can further provide haptic feedback communicating transitions into a control region of the space. The user can feel such transitions in advance, and is allowed to avoid unwanted transitions into a control's region by controlling the cursor responsive to the haptic feedback. An example embodiment of the present invention comprises a method of providing a user-computer interface, comprising: (a) providing a display; characterized by x and y coordinates defining a plane approximately orthogonal to the direction of the user's view into the display; (b) providing an input device, moveable by the user in three dimensions termed x, y, and z; (c) establishing a correspondence between motion of the input device and motion of a cursor representation in the display; (d) displaying to the user a three-dimensional display space using a first portion of the display plane; (e) displaying to the user a control using a second portion of the display plane; (f) determining if user motion of the input device corresponds to a cursor representation location within the first portion of the display plane, and, if so, then allowing user motion of the input device to move the cursor representation in three dimensions within the three-dimensional space; (g) determining if user motion of the input device corresponds to a cursor representation location within the second portion of the display plane, and, if so, then providing user interaction according to the control. In another example embodiment, the correspondence between motion of the input device and motion of a cursor representation in the display is such that motion of the input device into a portion of its range of motion defined by a first range of x coordinates, a second range of y coordinates, and all possible z coordinates in the input device's range of motion, corresponds to a cursor representation within the second portion of the display.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

FIG. 1(a,b) is an illustration of a three-dimensional space and associated display conventions.

FIG. 2(a,b) is an illustration of a three-dimensional space including a control according to the present invention.

FIG. 4(a,b) is an illustration of multiple controls distinguishable by entering depth.

FIG. 5(a,b) is a representation of a set of three-dimensional controls associated with a three-dimensional space.

DETAILED DESCRIPTION OF THE INVENTION

The present invention provides a method of human-computer interfacing that provides efficient implementation of intuitive controls in a three-dimensional space. The method comprises providing a three-dimensional space, characterized by x and y dimensions, together defining a plane approximately orthogonal to the user's direction of view into the space. A z dimension, approximately parallel to the direction of view, further characterizes the three-dimensional space. Objects in the space can be defined by x, y, and z coordinate sets. A control is provided having x and y coordinate sets as any other object. The z coordinate set of the control, however, spans a range of values, giving the control an increased depth. The control's range of z can be infinite, making the control accessible at all depths, or can be a finite range, making the control accessible only from that range of depths. Movement of a cursor into the region corresponding to the control initiates interaction with the user according to the control. The increased depth makes it easier for the user to access the control, since it reduces the precision of depth perception required to find the control. Once the user is in the region corresponding to the control, the effective depth for interaction can be relative to the depth when the user entered the control region, providing control interaction independent of the depth when the user entered the control.

Three-Dimensional Display and Interaction

Figure 1A:
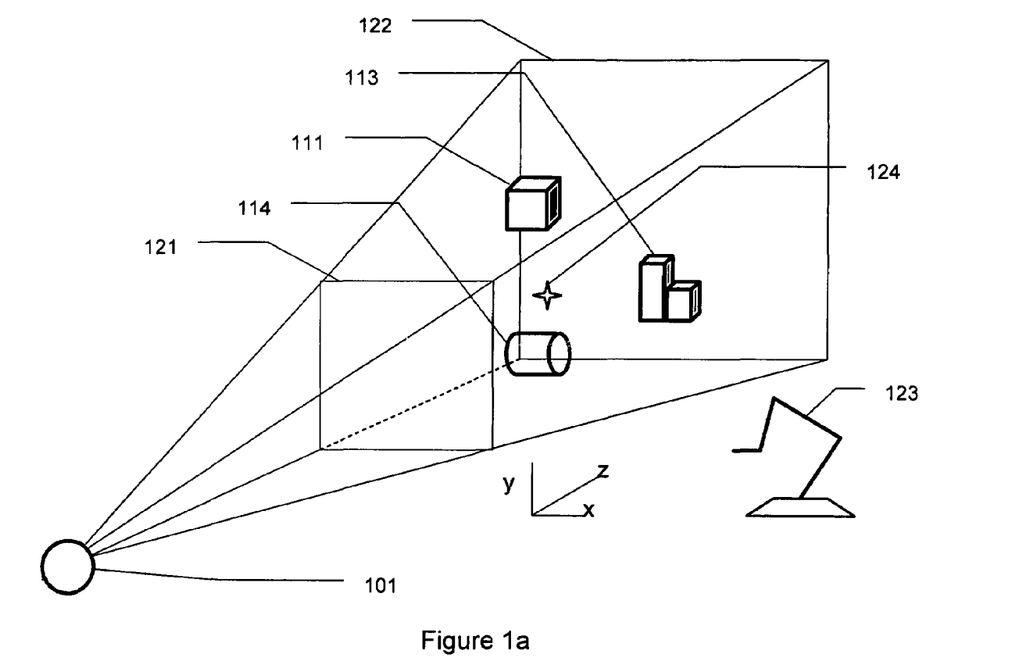
Figure 1B:
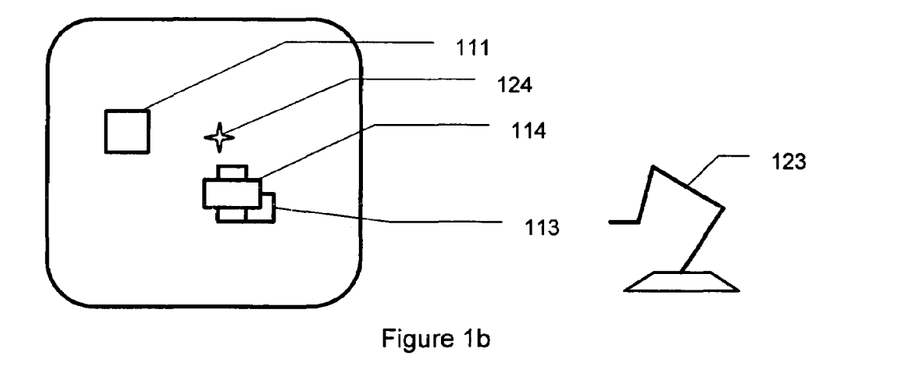

FIG. 1(a,b) is an illustration of a three-dimensional space and associated projection matrix display conventions. A viewpoint 101 provides a reference for a coordinate system: x and y defining planes approximately orthogonal to the direction from viewpoint 101 to the planes, and z approximately parallel to the direction. A front image plane 121 defines the projection that will be displayed to the user (shown in FIG. 1b); objects closer to the viewpoint 101 than the front image plane 121 are not displayed. A rear image plane 122 defines the limit of the space to projected; objects farther from the viewpoint 101 than the rear plane 122 are not displayed. Each planes is defined by its z coordinate and by its width and height. Different applications can benefit from various image planes, e.g., defining the rear image plane to z=infinity allows display of even the farthest away objects, while setting it to a lesser value keeps far away objects from cluttering the display. FIG. 1b shows the projection onto the front image plane: objects 111, 112 are shown smaller than object 114 due to their greater distance from the front image plane 121, while object 114 partially obscures object 113 since their x and y coordinates overlap and object 114 is nearer the front image plane 121 than object 113.

The three-dimensional space can also accommodate a cursor controllable by the user. The current position of the cursor can be included in the display of the space, for example by displaying an object 124 representing the cursor at its current position. The user can affect the position of the cursor in various ways, including, for example, by keystrokes, by manipulation of a three-dimensional pointing device 123 (three dimensional pointing devices are inherently moveable in three dimensions, for convenience of reference, these dimensions are often referred to as Cartesian coordinates x, y, and z), and by a combination of button or key control and manipulation of a two-dimensional pointing device. Visual feedback of cursor position can provide detailed information of the cursor's position in x and y relative to other objects in the space; comparison in z can be less precise since it relies on depth perception.

Three-Dimensional Controls

The three-dimensional space can include controls accessible by the user. For example, a button can be provided in the space to allow the user to control interface functions. Locating the button with a three-dimensional cursor can be difficult, however: x and y are generally straightforward, but z can be difficult (since it can be difficult to know exactly the depth of the cursor). Two-dimensional controls can overcome this difficulty by mapping the controls to a certain x, y region of the display. Such two-dimensional mapping, however, does not provide three-dimensional interaction with the controls, and deprives the two-dimensional region from the implementation specifics of the three-dimensional space (implementing two separate spaces can be less efficient than implementing a single space).

Figure 2A:
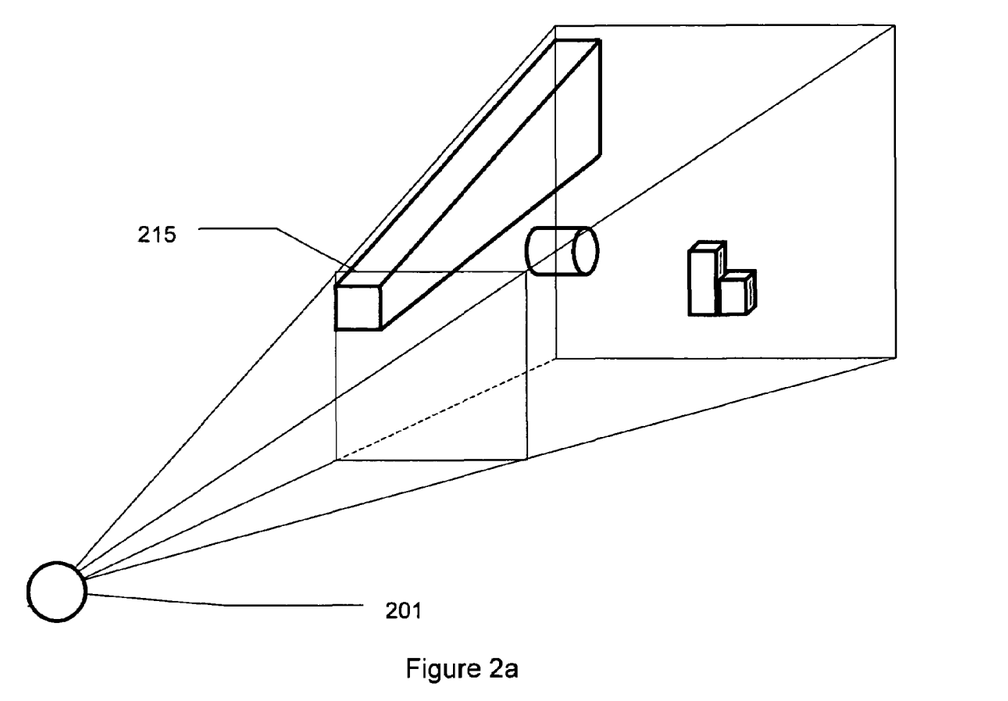
Figure 2B:
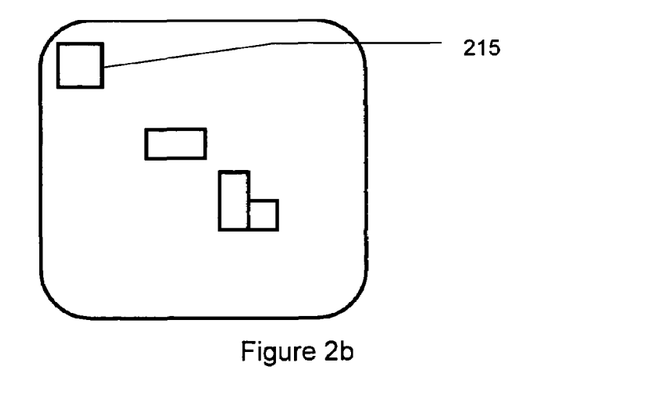

The present invention provides controls mapped to x, y coordinates, and to a range of z coordinates. FIG. 2 illustrates a three-dimensional space including a control 215 according to the present invention. The control 215 has a corresponding x, y coordinate set, and a range of z coordinates. The display of the space includes the control 215 at the corresponding projection onto the front plane. The user accordingly can easily visually find the control. The user can also access the control by moving a cursor into the x, y region, and anywhere in the range of z of the control. Fine control in x, y can be needed to select the control, but the range of z coordinates allows much more leeway in cursor depth for accessing the control. Note that if the range of z corresponding to the control is entirely behind the rear plane or entirely in front of the front plane, then the control will not be visible (or accessible if the cursor motion is limited to the region of the space between the two planes).

Once the user positions the cursor within the portion of the space corresponding to the control, the depth of the cursor can be treated as relative to the depth on entering the control. The user accordingly is presented with a consistent interaction environment with the control, independent of the depth at which the control was accessed. For example, consider a control that includes an action initiated whenever the user pushed the cursor into the control beyond a threshold depth. Without relative control depth, the user might enter the control with the cursor already past the depth and unexpectedly initiate the action. Further, the user could not know the additional depth needed to initiate the action with any more precision than the user knew the depth upon entering the control. With relative depth, however, the user moves into the control from any depth, and is presented with a consistent interface: the user enters the control at any initial haptic depth, then a consistent depth change (relative to the initial depth) initiates the action.

The visual depth can also be treated separately from the haptic depth, for example by setting the visual depth to a consistent value on every entry to the control. This provides a consistent visual cue to the user, providing an interface with controls that always present the same look and feel: when the user moves into the control region, the visual cursor looks the same every time, and the depth characteristics of the control (e.g., how far to push to activate a button) are also the same every time. Note that separating the haptic depth from the visual depth can lead to an intersensory discrepancy, where the visual cue indicates the same depth even though the input device might be at different depths. Proprioceptive sense over typical computer input device motions (e.g., finger or wrist motion) is generally dominated by the visual perception, so the user is left with the impression that the controls are always at a dependable location.

Additional interface characteristics can be accommodated with separation of the visual and haptic depths. For example, the haptic depth can be restricted to a small range while in the control, so that the user cannot pull too far away from the controls and so that the user cannot push past the felt base or back of the control. Also, the haptic depth in the control can be restricted so that the user cannot move the input device into undesirable portions of its range of motion. If the user enters the control at a depth corresponding to an undesirable portion of the input device's range of motion, then the haptic depth can be adjusted as the user moves within the control to urge the user into more desirable portions of the device's range of motion (e.g., the "back" of the control can be in a limited range of motion if, with some input devices, the user enters the control near the extreme back of the device's range of motion; any movement by the user in the control away from such extreme can allow redefinition of the "back" of the control away from such extreme, without the user having to leave and re-enter the control). Further, haptic force can be fed back to the input device to force the input device into a desirable portion of its range of motion once the user enters the control.

Depth-Defined Controls

Figure 3:
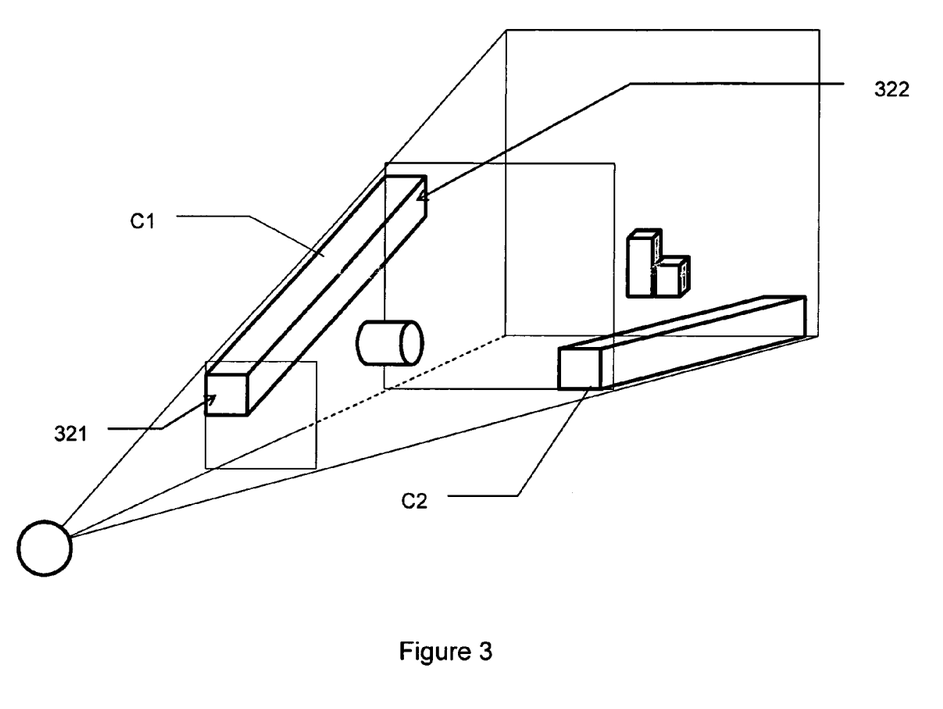
FIG. 3 is an illustration of controls active in certain regions.
Figure 4A:
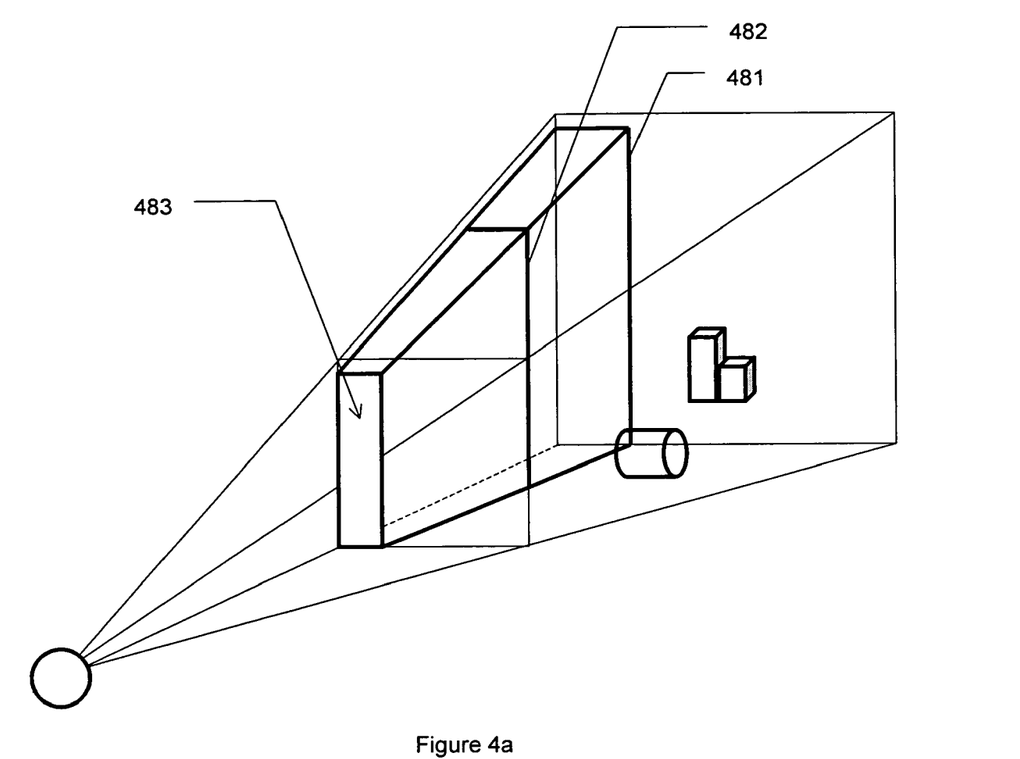
Figure 4B:
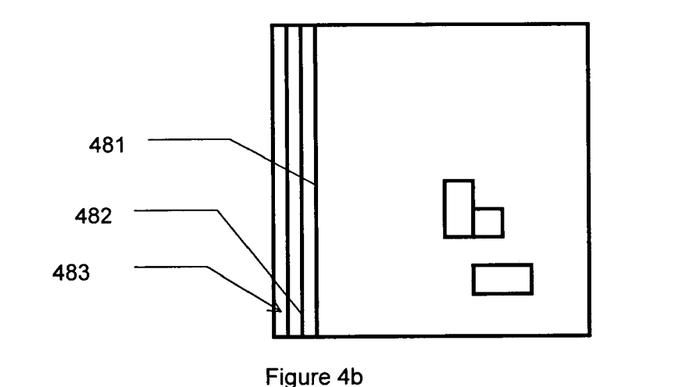

The mapping of controls to a range of z coordinates allows controls to be active only in certain regions of the space. For example, a certain control might be only active when the cursor depth places the cursor within a defined region of the space (e.g., within an object, or beyond a threshold distance from a base location, or mapping of two controls to the same x, y region and allowing the user to select between the two by easy to manage gross depth changes). FIG. 3 is an illustration of controls active only in certain regions. Control C1 is mapped to a range of z corresponding to the portion of the space between planes 321, 322. When the cursor is between those two planes, control C1 is visible at the corresponding x, y coordinates, and can be accessed by moving the cursor into that portion of the space. Moving the cursor in depth beyond plane 322 moves the range of z for control C1 in front of the now-front plane 322, making it not visible in the display. Control C2, previously beyond then-rear plane 322 and consequently invisible, is now displayed and accessible to the user. Controls with different depths can be mapped to the same x, y coordinates; visual cues can provide user knowledge of the depths corresponding to the individual controls. For example, controls at different depths can have different display colors, and the cursor color changed to match as the cursor depth changed. As another example, the control x, y coordinates can provide a slight slope or a step to the control as in FIG. 4(*a,b*), allowing the user to visually detect the intersection of the cursor with the boundary of the control.

Controls With Haptic Feedback

The transition between the control and the rest of the space can be communicated to the user by visual feedback, for example by display of a representation of the cursor. The transition can also be communicated haptically, for example by applying a force directed away from the control when the cursor approaches the control portion of the space. Such haptic feedback allows the user to feel the transition to the control, controlling such transitions by feel and freeing visual attention and bandwidth for other interface functions.

Haptic feedback can also be used to enhance the user interface characteristics of the control. Haptic feedback, with haptic depth treated as relative to the depth on entering the control, can allow force feedback and force sensing to enhance the user interface characteristics. For example, haptic feedback can allow the user to feel various functions in the control portion, such as various buttons, knobs, or sliders. The user can also control the operation of the interface in the control portion by controlling the force applied to a force sensitive input device, for example by pushing a button past a threshold force to activate it, or by pushing a slider with varying force to achieve varying control behavior.

Multiple Controls

The present invention can also accommodate multiple controls. A control portion of the space can have a plurality of individual controls presented to the user, for example a panel of buttons can be presented in a control portion of the space. Multiple control portions can also be used, for example, by placing control portions near edges of the space, or near regions where such control might be most often useful.

As mentioned above, the depth of the cursor in the space can also contribute to discrimination among control sets.

The controls within a control region, and the portion corresponding to the control region, can change with cursor depth. For example, one set of controls might be presented to the user when the user is in a portion of the space with few objects, another when the user is in a more dense portion, and another when the user moves the cursor within an object.

The present invention is useful with many three-dimensional navigation schemes, and with many different three-dimensional interaction paradigms. The range-of-depth mapping of the control portion allows intuitive interface techniques and skills developed in two-dimensional interfaces to be readily applied in more complex three-dimensional interfaces.

Example Controls

Figure 5A:
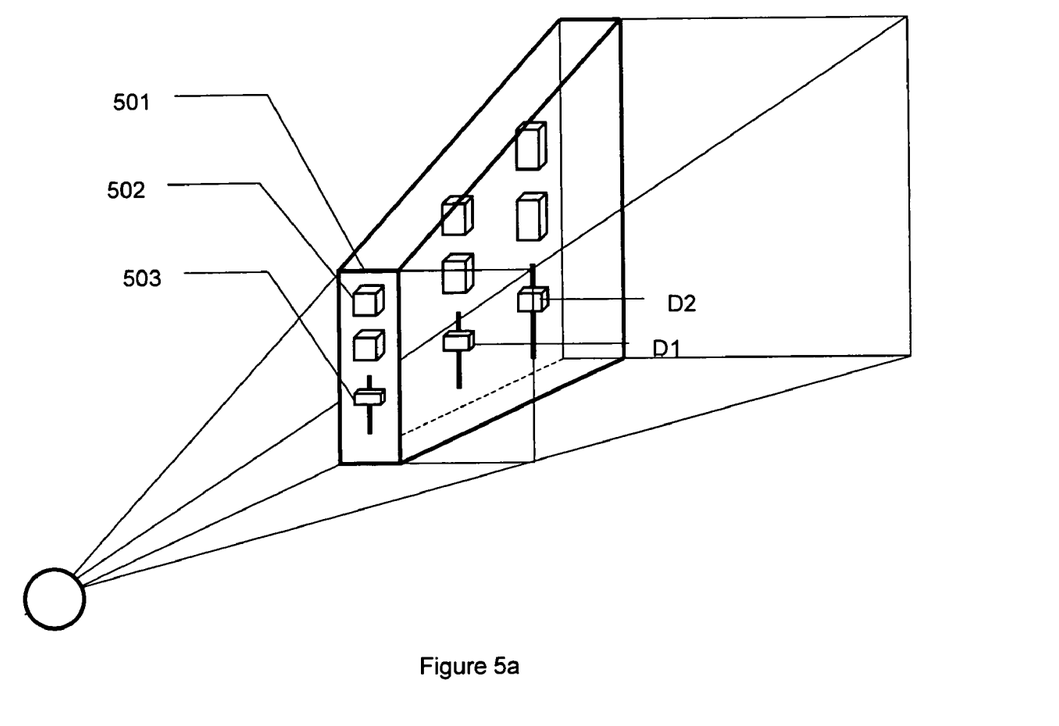
Figure 5B:
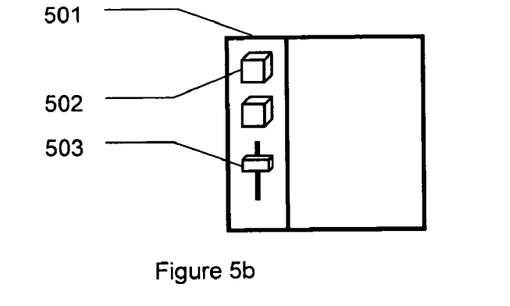

FIG. 5(a,b) is a representation of a set of three-dimensional controls associated with a three-dimensional space. FIG. 5b shows the graphical display of the example, with a control region 501 near the left edge of the display. Within the control region are several controls, for example three-dimensional buttons 502 and sliders 503. FIG. 5a shows a representation of the three-dimensional space, including the haptic presentation of the controls shown at two example depths D1, D2 and the graphical representation of the controls at the front plane in the figure. The control region 501 is mapped to a range of z coordinates, so that the user can always see the controls available at the left edge of the display, independent of the user navigation in the three-dimensional space. The user can enter the control region 501 at any depth, for example at depths D1, D2 in FIG. 5a. The haptic depth can be treated as relative to the entering depth, for example D1, D2, so that the controls always present the same feel to the user, independent of entering depth. For example, when entering the control at depth D1, positioning the cursor over a button and pushing the button a short distance from D1 into the depth initiates the action corresponding to the button. When entering the control at depth D2, positioning the cursor over a button and pushing the button a short distance from D2 into the depth initiates the action corresponding to the button. In either case, the interface presents the same feel to the user to initiate the action, so the controls feel as though they are always at hand, or as though they move in depth with the user. As illustrated in the figure, the controls can be haptically larger at greater depth to compensate for the increased haptic space at greater depths, and consequently presenting the user controls that feel as though they are of a consistent size.

As discussed above, the visual depth of the control can correspond to the entering depth, or can be set to a consistent value. If set to the entering depth, then the buttons and sliders will appear smaller at increased depths (due to increased distance from the viewpoint), giving the visual cue that the controls actually move in depth with the user. If set to a consistent depth, then the buttons and sliders, and cursor when in the control region, present a consistent image, giving the user the visual cue that the controls are always at hand. As discussed above, visual feedback will generally dominate proprioceptive sense over the range of motion of typical computer input devices, so the visual cue can be used to give the desired impression of control depth to the user without complicating the haptic depth management used to provide consistent control feel.

The x, y region of the control can also be managed based on the x, y position of the cursor. For example, the control region can be smaller when the user is not in the control than when the user is in the control, allowing more of the display space to be devoted to whichever portion is of current importance. Also, the region of the control can be increased as the cursor approaches the control, allowing the control the remain unobtrusive until the user appears likely to enter it.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

I claim:

1. A method of providing a user-computer interface, comprising:
    a) providing a display, characterized by x and y coordinates defining a plane approximately orthogonal to the direction of the user's view into the display;
    b) providing an input device, moveable by the user in three dimensions termed x, y, and z;
    c) establishing a correspondence between motion of the input device and motion of a cursor representation in the display;
    d) displaying to the user a three-dimensional display space using a first portion of the display plane;
    e) displaying to the user a control using a second portion of the display plane;
    f) determining if user motion of the input device corresponds to a cursor representation location within the first portion of the display plane, and, if so, then allowing user motion of the input device to move the cursor representation in three dimensions within the three-dimensional display space;
    g) determining if user motion of the input device corresponds to a cursor representation location within the second portion of the display plane, and, if so, then providing user interaction according to the control.

2. The method of claim 1 wherein interaction according to the control comprises two-dimensional interaction.

3. The method of claim 1 wherein the correspondence between motion of the input device and motion of a cursor representation in the display is such that motion of the input device into a portion of its range of motion defined by a first range of x coordinates, a second range of y coordinates, and all possible z coordinates in the input device's range of motion, corresponds to a cursor representation within the second portion of the display.

4. The method of claim 1 wherein providing for interaction according to the control comprises:
    a) establishing an initial control z coordinate from the z coordinate in the three dimensional display space of the cursor when the cursor entered the second portion of the display plane;
    b) determining a control depth from the z component of the cursor's motion in the three dimensional display space after entering the control relative to the initial control z coordinate, where the control depth is substantially independent of the value of the initial control z coordinate; and
    c) providing for interaction with the control according to the control depth.

5. The method of claim 4, wherein providing for interaction according to the control further comprises issuing a command to the computer if the control depth exceeds a threshold value.

6. The method of claim 4, wherein providing for interaction according to the control further comprises providing haptic feedback, comprising interaction relative to a haptic depth, to the user with the haptic depth corresponding to the control depth.

7. The method of claim 1, wherein providing for interaction according to the control comprises determining a command from the x and y coordinates of the cursor representation in the display plane at the time the user indicates to issue a command.

8. The method of claim 7, wherein providing for interaction according to the control comprises issuing the command if a user indicates a cursor motion having a change in z coordinate in the three dimensional display space that exceeds a threshold value.

9. The method of claim 1, further comprising:
a) displaying a second control characterized by a third portion of the display plane; and
b) determining if user motion of the input device corresponds to a cursor representation location within the third portion of the display plane, and, if so, then providing user interaction according to the second control.

10. The method of claim 1, wherein displaying a control comprises displaying a region comprising a plurality of symbols representative of computer interface functions, and wherein providing for interaction according to the control comprises determining which symbol corresponds to the location of the cursor representation when the user indicates to initiate an action and initiating the interface function corresponding to the symbol.

11. The method of claim 1, wherein displaying the control comprises displaying the control at a first size when the cursor representation is not within a threshold distance of the second portion of the display, and displaying the control at a second size, larger than the first size, when the cursor representation is within the threshold distance of the second portion of the display.

12. A method of providing a human-computer interface, comprising:
a) Providing a display of a three-dimensional space, where objects in the space are characterized by x, y, and z coordinates within the three-dimensional space, and where the display is provided relative to display x and y coordinates in a plane approximately orthogonal to the user direction of view into the display, and a z coordinate, approximately parallel to the user direction of view into the display, where the relationship between the three-dimensional space and the display coordinates is variable;
b) providing a control portion of the display, characterized by an x and y coordinate set relative to the x and y coordinates of the display and independent of the relationship between the three-dimensional space and the display, and by a range of z coordinates relative to the z coordinates of the display and independent of the relationship between the three-dimensional space and the display, and providing for display of the control portion in conjunction with the display of the three-dimensional space;
c) providing an input device, moveable by the user in three dimensions termed x, y, and z;
d) establishing a correspondence between motion of the input device and motion of a cursor representation in the display;
e) determining when the x and y coordinates, relative to the display, of the cursor representation is within the x and y coordinate sets of the control portion of the display, and when the z coordinate, relative to the display, of the cursor representation is within the range of z coordinates for the control, and if so, issuing a command to the computer corresponding to the control responsive to a signal from the user.

13. The method of claim 12, wherein the signal from the user comprises the user directing a change in the z coordinate of the cursor representation exceeding a threshold value relative to the z coordinate of the cursor representation when its x and y coordinates first came within the x and y coordinate sets of the control.

14. The method of claim 12, further comprising:
a) a second control portion of the display, characterized by a second x and y coordinate set, and by a second range of z coordinates, and providing for display of the second control portion in conjunction with the display of the three-dimensional space;
b) determining when the x and y coordinates of the cursor representation are within the second x and y coordinate set of the second control, and when the z coordinate of the cursor representation is within the second range of z coordinates for the second control, and if so, issuing a command to the computer corresponding to the second control responsive to a signal from the user.

15. The method of claim 12, further comprising providing haptic feedback to the user when the cursor representation is within the control portion.

16. The method of claim 15, wherein providing haptic feedback comprises providing a force resisting motion of the input device that would correspond to a change in the z coordinate of the cursor representation until the z coordinate change exceeds a threshold value, then perceptibly reducing the force.

17. The method of claim 12, further comprising providing a force resisting motion of the input device that would correspond with motion of the cursor representation toward a boundary between the control portion and the remainder of the space whenever the cursor representation approaches said boundary.

18. The method of claim 17, further comprising perceptibly reducing the force when the cursor representation crosses such boundary.

* * * * *